(12) United States Patent
Bacher et al.

(10) Patent No.: US 7,515,589 B2
(45) Date of Patent: Apr. 7, 2009

(54) METHOD AND APPARATUS FOR PROVIDING NETWORK VIRTUALIZATION

(75) Inventors: Utz Bacher, Tuebingen (DE); Angelo Macchiano, Apalachin, NY (US); Dennis R. Musselwhite, Hallstead, PA (US); Bruce H. Ratcliff, Red Hook, NY (US); Stephen R. Valley, Valatie, NY (US)

(73) Assignee: International Business Machines Corporation, Armonk, NY (US)

( * ) Notice: Subject to any disclaimer, the term of this patent is extended or adjusted under 35 U.S.C. 154(b) by 739 days.

(21) Appl. No.: 10/928,824

(22) Filed: Aug. 27, 2004

(65) Prior Publication Data

US 2006/0045089 A1    Mar. 2, 2006

(51) Int. Cl.
*H04L 12/56* (2006.01)
(52) U.S. Cl. .................. 370/392; 370/475; 709/245; 718/1; 718/104
(58) Field of Classification Search .............. None
See application file for complete search history.

(56) References Cited

U.S. PATENT DOCUMENTS

| | | | |
|---|---|---|---|
| 5,740,438 A | 4/1998 | Ratcliff et al. | |
| 5,974,049 A | 10/1999 | Ratcliff et al. | |
| 5,987,515 A | 11/1999 | Ratcliff et al. | |
| 5,999,536 A * | 12/1999 | Kawafuji et al. | 370/401 |
| 5,999,974 A | 12/1999 | Ratcliff et al. | |
| 6,003,080 A | 12/1999 | Ratcliff et al. | |
| 6,006,261 A | 12/1999 | Ratcliff et al. | |
| 6,014,699 A | 1/2000 | Ratcliff et al. | |
| 6,084,859 A | 7/2000 | Ratcliff et al. | |
| 6,122,669 A * | 9/2000 | Crayford | 709/232 |
| 6,185,218 B1 | 2/2001 | Ratcliff et al. | |
| 6,327,621 B1 | 12/2001 | Lee et al. | |
| 6,389,027 B1 | 5/2002 | Lee et al. | |
| 6,490,285 B2 | 12/2002 | Lee et al. | |
| 6,600,743 B1 | 7/2003 | Lee et al. | |
| 6,772,221 B1 | 8/2004 | Ratcliff et al. | |

(Continued)

OTHER PUBLICATIONS

OSA-Express Implementation Guide, IBM Redbooks, SG24-5948-02, Jan. 2003.

(Continued)

*Primary Examiner*—Wing F Chan
*Assistant Examiner*—Brian Roberts
(74) *Attorney, Agent, or Firm*—Arthur Ortega; William A. Kinnaman, Jr.

(57) ABSTRACT

A network virtualization layer for an information handling system in which a physical machine coupled to a network is divided into a plurality of logical partitions, each of which has a host system residing thereon. In response to receiving a set command from one of the host systems specifying a data link layer (layer 2) address, the virtualization layer associates the data link layer address with the host system and forwards to the host system data packets specifying the data link layer address as a destination address. Unicast packets are forwarded to the single host system specifying the destination address as an individual MAC address, while multicast packets are forwarded to each host system specifying the destination address as a group MAC address. A host system may also specify a virtual LAN (VLAN) ID, which is used to scope the forwarding of packets to host systems sharing that VLAN ID.

12 Claims, 8 Drawing Sheets

U.S. PATENT DOCUMENTS

| | | | |
|---|---|---|---|
| 6,880,002 B2 * | 4/2005 | Hirschfeld et al. | 709/223 |
| 7,080,135 B1 * | 7/2006 | Williams | 709/223 |
| 7,111,303 B2 * | 9/2006 | Macchiano et al. | 719/313 |
| 7,245,627 B2 * | 7/2007 | Goldenberg et al. | 370/419 |
| 7,287,186 B2 * | 10/2007 | McCrory et al. | 714/13 |
| 2002/0009078 A1 | 1/2002 | Wilson et al. | |
| 2002/0029286 A1 | 3/2002 | Gioquindo et al. | |
| 2002/0075878 A1 | 6/2002 | Lee et al. | |
| 2002/0184368 A1 | 12/2002 | Wang | |
| 2003/0115218 A1 | 6/2003 | Bobbitt et al. | |
| 2003/0126202 A1 | 7/2003 | Watt | |
| 2004/0028048 A1 * | 2/2004 | Jin | 370/392 |
| 2004/0240440 A1 * | 12/2004 | Wild et al. | 370/389 |
| 2005/0129040 A1 * | 6/2005 | Kiel et al. | 370/412 |
| 2005/0138620 A1 * | 6/2005 | Lewites | 718/1 |
| 2005/0182853 A1 * | 8/2005 | Lewites et al. | 709/238 |

OTHER PUBLICATIONS

OSA-Express for IBM eServer zSeries and S/390, IBM, G221-0110-03, Apr. 2004.

Linux on IBM eServer zSeries and S/390: VSWITCH and VLAN Features of z/VM 4.4, pp. 1-44.

IBM eServer zSeries 890—A Multipurpose Server for an On Demand World, Hardware Announcement, Apr. 7, 2004, IBM, pp. 1-24.

IBM Enhances the IBM eServer zSeries 990 Family of Servers, IBM, Hardware Announcement Apr. 7, 2004, pp. 1-14.

IBM z/VM 4.4 Improves Virtualization Capabilities for Linux on zSeries, IBM, Software Announcement May 13, 2003, pp. 1-20.

IBM z.VM V5.1 Extends zSeries on Demand Capabilities with Linux-related Enhancements and Introduces a New Pricing Model, IBM, Software Announcement Apr. 7, 2004, pp. 1-23.

* cited by examiner

METHOD AND APPARATUS FOR PROVIDING NETWORK VIRTUALIZATION

BACKGROUND OF THE INVENTION

1. Field of the Invention

This invention relates to a method and apparatus for the virtualization of a data link layer (layer 2) connectivity for hosts residing in a virtualized networking environment. More particular, the invention relates to a method and apparatus for providing network virtualization in an information handling system in which a physical machine coupled to a network is divided into a plurality of logical partitions, each of which has a host system residing thereon.

2. Description of the Related Art

The IBM Open Systems Adapter (OSA) is a hardware element that interfaces between an IBM S/390 or zSeries processor and a network, which may be a private network within an enterprise, a public network, or a combination of both. References that describe the Open Systems Adapter include the following patents, patent applications and publications, incorporated herein by reference:

- U.S. Pat. No. 6,772,221, Ratcliff et al., "Dynamically configuring and monitoring hosts connected in a computing network having a gateway device"
- U.S. Pat. No. 6,600,743, Lee et al., "IP multicast interface"
- U.S. Pat. No. 6,490,285, Lee et al., "IP multicast interface"
- U.S. Pat. No. 6,389,027, Lee et al., "IP multicast interface"
- U.S. Pat. No. 6,327,621, Lee et al., "Method for shared multicast interface in a multi-partition environment"
- U.S. Pat. No. 6,185,218, Ratcliff et al., "Communication method and apparatus for use in a computing network environment having high performance LAN connections"
- U.S. Pat. No. 6,084,859, Ratcliff et al., "Internet Protocol assists using multi-path channel protocol"
- U.S. Pat. No. 6,014,699, Ratcliff et al., "Internet Protocol assists for high performance LAN connections"
- U.S. Pat. No. 6,006,261, Ratcliff et al., "Internet Protocol assists using multi-path channel protocol"
- U.S. Pat. No. 6,003,080, Ratcliff et al., "Internet Protocol assists using multi-path channel protocol"
- U.S. Pat. No. 5,999,974, Ratcliff et al., "Internet Protocol assists for high performance LAN connections"
- U.S. Pat. No. 5,987,515, Ratcliff et al., "Internet Protocol assists using multi-path channel protocol"
- U.S. Pat. No. 5,974,049, Ratcliff et al., "Internet Protocol assists for high performance LAN connections"
- U.S. Pat. No. 5,740,438, Ratcliff et al., "Methods and system for network communications of multiple partitions"
- U.S. Patent Appl. Pub. 2002/0075878, Lee et al., "IP Multicast Interface"
- U.S. Patent Appl. Pub. 2002/0029286, Gioquindo et al., "Communication between multiple partitions employing host-network interface"
- *OSA-Express Implementation Guide*, IBM Redbooks, SG24-5948-02, January 2003
- *OSA-Express for IBM eServer zSeries and S/390*, IBM, G221-9110-03, April 2004

A great deal of effort has been expended recently on the consolidation of server workloads onto enterprise-class servers such as the IBM eServer zSeries servers. Such consolidation can produce considerable efficiencies of utilization, since the individual workloads tend to average out on a large server. However, such server consolidation efforts and the cost of high-speed network adapters (i.e., TCP/IP offload and 10 Gb/s) are also driving the need for network virtualization. That is to say, users of enterprise computing systems want a single physical network interface card (NIC) to support multiple servers. However, in an environment that has hundreds if not thousands of servers, each of which needs to have dual network connect capabilities for failover, the complexity and cost of having dual NICs per server image is no longer practical. To be successful and provide a solution which can support a large, heterogeneous consolidated server environment, the network virtualization layer must be protocol independent. A high percentage of the traffic into the consolidated server will be TCP/IP traffic, but there will still be some servers that require non-TCP/IP protocols to flow. User requirements often specify that a connection support network connectivity both for TCP/IP protocols and for non-TCP/IP protocols.

The present invention provides a protocol-independent solution that bridges virtual and physical layer 2 communications into a single seamless networking fabric.

BRIEF SUMMARY OF THE INVENTION

In general, the present invention contemplates a method and apparatus providing network virtualization in an information handling system in which a physical machine coupled to a network is divided into a plurality of logical partitions, each of which has a host system residing thereon. A network virtualization layer (NVL) between the host systems and the network operates at the data link layer, layer 2 in the Open System Interconnect (OSI) model. In response to receiving a set command from one of the host systems specifying a data link layer address for that host system, the network virtualization layer associates the specified data link layer address with the host system. The specified data link layer address may be an individual Media Access Control (MAC) address exclusively held by one of the host systems or a group MAC address shared by two or more such systems. Still another set command to the network virtualization layer allows a host system to specify a virtual LAN (VLAN) ID for itself.

On receiving a unicast or multicast data packet containing a data link layer address as a destination address, the network virtualization layer determines whether a host system is associated with the destination address. If a host system is associated with the destination address, the network virtualization layer forwards the data packet to the one host system associated with the destination address, if the destination address is an individual MAC address of a unicast packet, or to each host system associated with the destination address if the destination address is a group MAC address of a multicast packet. If in addition the data packet contains a VLAN tag, then the network virtualization layer forwards such packet only to the host system or systems that have registered a matching VLAN ID. Broadcast packets containing a VLAN tag are forwarded to all host systems that have registered a matching VLAN ID.

Finally, in response to receiving a delete command from a host system specifying a data link layer address or VLAN ID, the network virtualization layer disassociates the specified data link layer address or VLAN ID from the host system In the network virtualization solution described herein, a single physical network adapter, or network interface card (NIC), can support thousands of individual servers. To be protocol independent, the network virtualization layer (NVL) runs as a data link layer, or layer 2, entity. This entails that each host have a unique layer 2 address, which equates to a Media Access Control (MAC) address. There are no currently available NICs that can support thousands of MAC addresses. Therefore, the NVL manages a MAC address table that can assign a unique MAC address to each server. The NVL also supports group MAC addresses, which can have multiple servers sharing a single group MAC address. The layer 2 VLAN (virtual LAN) concept is also supported and the NVL manages the adding and removing of servers from a VLAN, so traffic for a specific VLAN can be segregated from the other servers not participating in the VLAN.

This invention contemplates a network virtualization layer (NVL) that manages the configuration and modification (adding and deleting) of all addressing functionality needed for a server to interface to a layer 2 environment. These functions include the defining and removing of a connection between the server and the NVL, the assigning of a unique MAC address by the NVL to the server, the registering of a group MAC address by a server with the NVL, and the adding and removing of a server from a VLAN.

In addition to the configuration functionality, the NVL controls the transmitting and receiving of LAN packets between a server and the NVL. These controls include the transmitting of a packet to a specific server associated with a MAC address, the transmitting of a packet to all the registered servers associated with a group MAC address, and the transmitting of a packet to all servers registered with the matching VLAN tag associated with a packet.

BRIEF DESCRIPTION OF THE DRAWING(S

DETAILED DESCRIPTION OF THE INVENTION

Figure 1A:
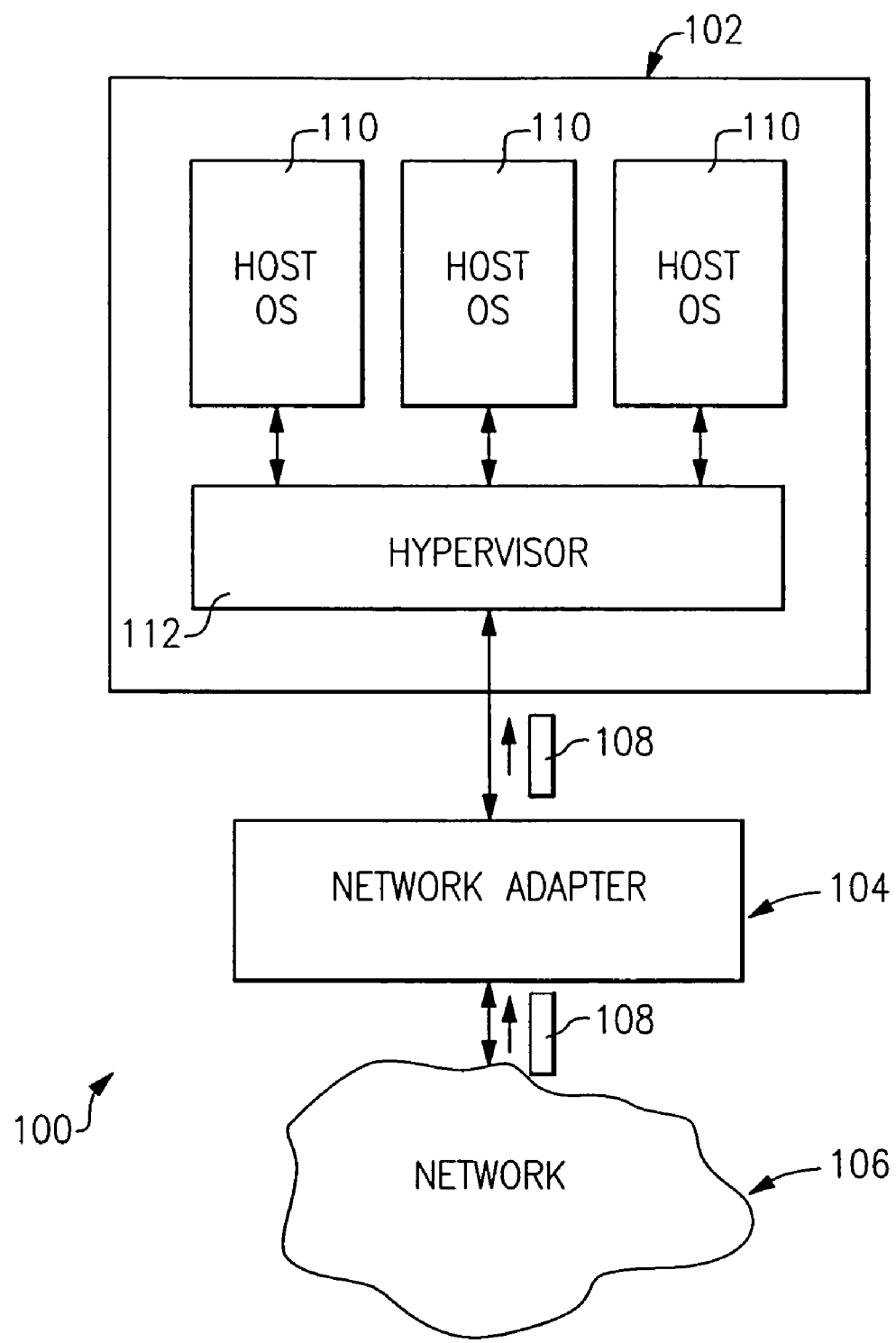
FIG. 1A shows a physical network configuration incorporating the present invention.

FIG. 1A shows a configuration 100 incorporating the present invention. Configuration 100 contains a physical machine 102 coupled via a network adapter 104 to a network 106. While the present invention is not limited to any particular hardware or software platform, in a preferred embodiment the physical machine 102 may constitute an IBM™ eServer™ zSeries™ server. (IBM, eServer and zSeries are trademarks of IBM Corporation). Network adapter 104 forwards data packets 108 between the network 106 and machine 102 and may comprise an IBM Open Systems Adapter, described in the patents and publications referenced above. Network 106 may be an internal network such as a local area network (LAN) within an organization, an external network, or a combination of both and may have other physical machines or devices (not shown) coupled to it.

In a conventional manner, machine 102 is partitioned into a plurality of logical machines, each of which has its own host operating system (OS) 110 (also referred to herein as a "server" or simply a "host"), for example, an instance of the IBM z/OS™ or z/VM™ operating system or a UNIX™-based operating system such as the Linux™ operating system. (z/OS and z/VM are trademarks of IBM Corporation; UNIX is a registered trademark of The Open Group in the United States and other countries; Linux is a trademark of Linus Torvalds in the United States, other countries, or both.) A logical partition manager or hypervisor 112 enforces the partitioning of the machine resources and performs various services for the partitions.

Figure 1B:
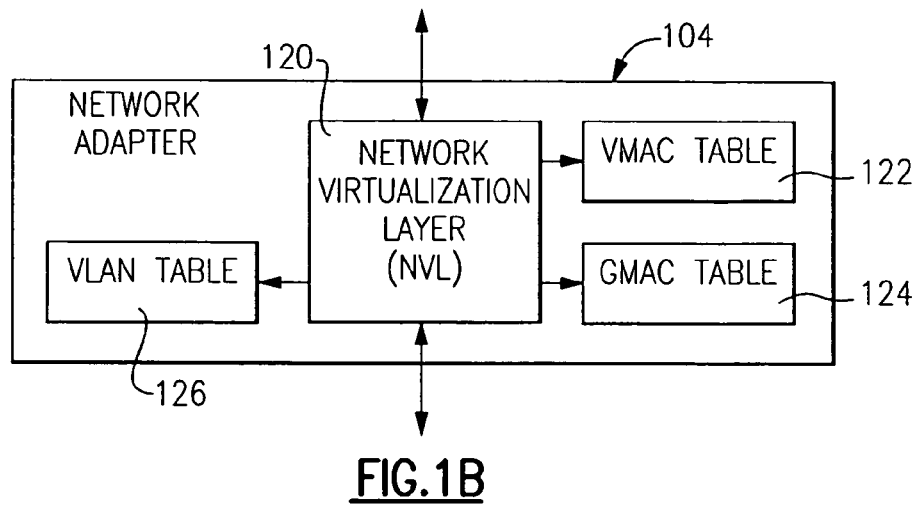
FIG. 1B shows the network adapter of FIG. 1.

Referring now to FIG. 1B, network adapter 104 contains a component 120 referred to herein as a network virtualization layer (NVL). In a manner to be described below, NVL 120 is used to define a unique Media Access Control (MAC) address for a requesting host OS 110, so that that host OS 110 has, as it were, a virtual network interface card (NIC) with its own MAC address, as shown in FIG. 1D. NVL 120 is also used to define a group MAC address or a VLAN ID for a requesting host OS 110, as described below. For this purpose, NVL 120 maintains several tables, including a virtual (individual) MAC address table 122, a group MAC address table 124, and a VLAN ID table 126.

Figure 1C:
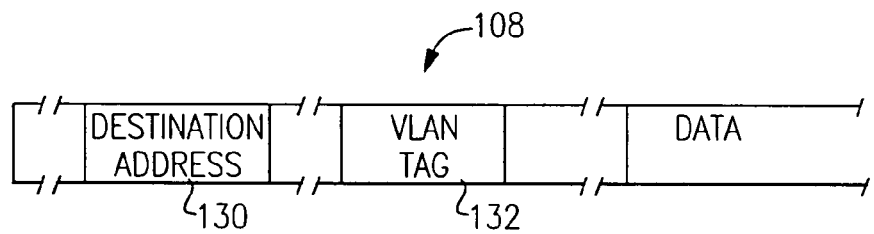
FIG. 1C shows a data packet.
Figure 1D:
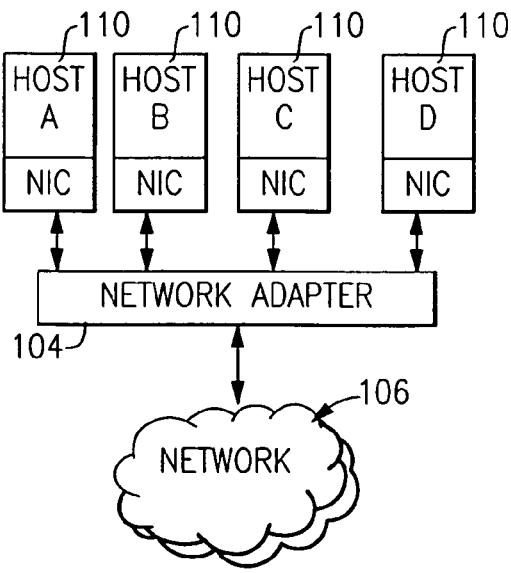
FIG. 1D shows a virtual network configuration created by the configuration shown in FIG. 1.

Referring to FIG. 1C, each data packet 108 traveling between network adapter 104 and either machine 102 or network 106 contains a number of fields of interest to the present invention, including a destination address field 130 and a VLAN tag 132. Destination address field 130 indicates the MAC address of the destination node for the packet 108. VLAN tag 132 indicates the virtual LAN, if any, to which the packet 108 is to be confined. As is known in the art, the MAC address is a data link layer (layer 2) address in the Open System Interconnection (OSI) model.

In accordance with the present invention, a set of layer 2 assist primitives are defined when running the network adapter 104 in a layer 2 environment. The format of these extensions is similar to that of the IP assist primitives used currently and described, for example, in the above-identified U.S. Pat. No. 5,974,049. The command codes are defined such that they are unique values in case the existing layer 3 and new layer 2 assists are allowed to flow on the same data device. A new version (=2) is defined for the layer 2 primitives.

The following table outlines the new format:

| Offset | Length | Description |
| --- | --- | --- |
| 0 | 1 | Command |
| 1 | 1 | Initiator: 00 = host, 01 = OSA |
| 2 | 2 | Sequence number set by initiator |
| 4 | 2 | Return code |
| 6 | 1 | LAN type |
| 7 | 1 | LAN number |
| 8 | 1 | Version = 2 |
| 9 | 1 | Count = 1 |
| 10 | 2 | Reserved (IP version for layer 3) |
| 12 | 4 | Layer 2 assists supported |
| 16 | 4 | Layer 2 assists enabled |
| 20 | N | Primitive-specific data |

In the above table, "OSA" refers to the network adapter 104, "host" refers to a host OS 110, and offsets and lengths are specified in terms of bytes. While the particular command codes used are not important (other than preferably not coinciding with those used for layer 3 primitives), in the embodiment shown, the command codes used at byte offset 0 are the following:

| Code | Command |
|------|---------|
| 0x21 | SETVMAC |
| 0x22 | DELVMAC |
| 0x23 | SETGMAC |
| 0x24 | DELGMAC |
| 0x25 | SETVLAN) |
| 0x26 | DELVLAN |

In the above table, the prefix "0x" indicates that the values are hexadecimal. In the embodiment shown, only one (individual) virtual MAC address, group MAC address or VLAN ID may be registered or unregistered on each invocation of one of these commands. This is done because if an error occurs on registering multiple addresses, the error recovery process may not be clearly defined. Therefore, the count field at byte offset 9 of these commands is always set to 1.

The basic changes in this format from the IP assist format are the following. The IP version number at offset 10 has been removed and changed to a reserved field. The IP assists supported and enabled at offsets 12 and 16 respectively have been changed to the new layer 2 assists supported and enabled. The version number at offset 8 is also changed from a 1 to a 2.

SETVMAC/DELVMAC

Figure 2:
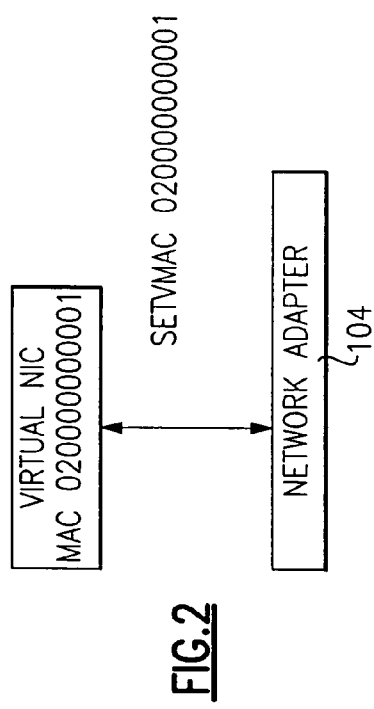
FIGS. 2 and 3 show the setting of a virtual MAC address in accordance with the present invention.

To enable the autonomic setting of a MAC address by a host 110 in NVL 120, a command called SETVMAC (Set Virtual MAC) is defined. This command enables any host 110 in a multiply partitioned environment to set one or more unique MAC addresses in NVL 120 (as shown in FIG. 2). NVL 120 adds each MAC to layer 2 forwarding table 122 and verifies that the address being added is unique, in a manner described below.

The SETVMAC layer 2 primitive is used to register a virtual MAC address with the network adapter 104. The network adapter 104 uses the virtual MAC address for layer 2 switching to determine how to forward a received packet 108. The DELVMAC layer 2 primitive is used to unregister a virtual MAC address from the network adapter 104.

The primitive-specific data for these commands beginning at byte offset 20 is as follows:

| Offset | Length | Description |
|--------|--------|-------------|
| 20 | 4 | Length of MAC address |
| 24 | 6 | Virtual MAC address of guest |

In the above table, "guest" refers to a host OS 110. The locally administered bit is set on for the virtual MAC address, since it is being administered by the network adapter 104. The group address bit is off, since the MAC address is an individual MAC address.

Figure 3:
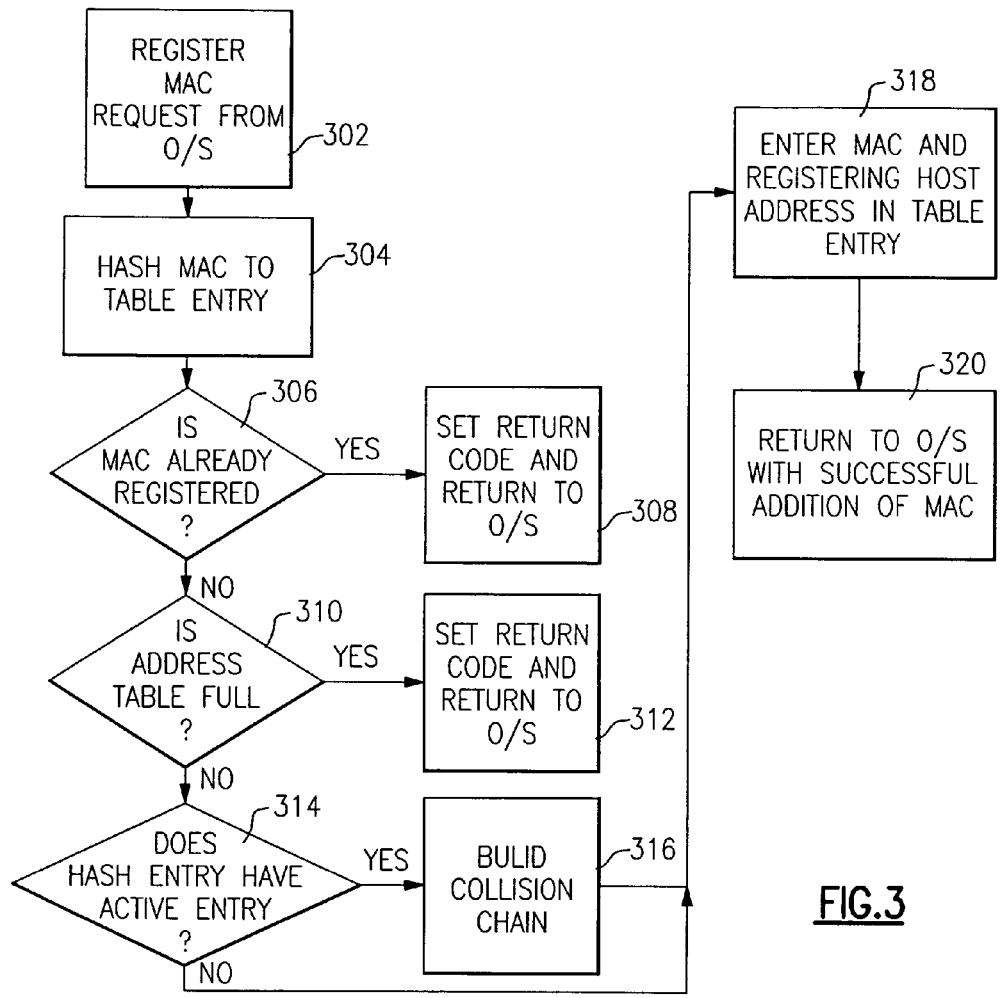

FIGS. 2 and 3 show the setting of a virtual MAC address by a host OS 110. The host OS 110 initiates the procedure by issuing to the network adapter 104 a SETVMAC command, in this case

SETVMAC 020000000001, where the above expression is a convenient mnemonic for the actual command format described above (step 302). In the above expression, 020000000001 is a variable indicating the target MAC address in hexadecimal form—more readably, 02-00-00-00-00-01.

Upon receiving this command, NVL 120 hashes the indicated MAC address to generate an index into virtual MAC address table 122 (step 304). If there is already an entry for that MAC address in the table 122, indicating that the MAC address has already been registered (step 306), NVL 120 generates an appropriate return code and returns to the host OS 110 (step 308). If the MAC address has not already been registered but the address table 122 is full (step 310), NVL 120 generates another appropriate return code and returns to the host OS 110 (step 312).

If neither of these conditions occurs and if the index position has an active entry for another MAC address (step 314), then a hash collision has occurred, and NVL 120 builds a collision chain to an available position in the table 122 (step 316). (Hash collision chains are entirely conventional in the art and are therefore not shown here.) After building such a chain, or if the index position has no active entry, NVL 120 enters the indicated MAC address together with host address information into the virtual MAC address table 122 (step 318) and returns to the host OS 110 with a code indicating the successful addition of a MAC address to the table 122 (step 320).

Figure 4:
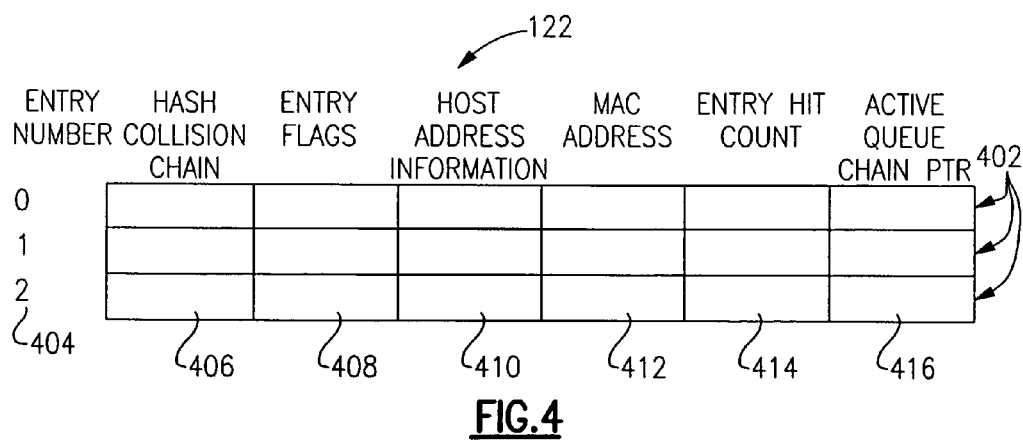
FIG. 4 shows the virtual MAC address table of the configuration shown in FIG. 1.

FIG. 4 shows the virtual MAC address table 122 (also referred to herein, along with tables 124 and 126, as a forwarding table). Table 122 contains a plurality of entries 402, each of which contains fields for an entry number 404, a hash collision chain 406, entry flags 406, host address information 408, a MAC address 410, an entry hit count 412, and an active queue chain pointer 414.

Entry number 404 is a hash that is computed on the MAC address and serves as an index into the table 122. Hash collision chain 406 is a linked list created for entries for MAC addresses that hash to the same entry number 404. Entry flags field 406 contains flags like active, collision and the like. Host address information field 408 contains a pointer to a control block that maps to the host OS 110 that registered the MAC address. MAC address field contains the MAC address registered. Entry hit count field 412 indicates the number of times that an inbound packet 108 has been forwarded using the host information for that particular entry 402. This value is used to reorder the hash collision chain to put the entry with the highest hit rate first. Once the hash chain is reordered, the counts are cleared and a timer is reset. The collision chains are periodically checked for this purpose. Finally, active queue chain pointer 414 is a linked list pointer used to chain all active entries on a single queue.

Each host 110 also has to ability to remove a MAC address from NVL 120. A DELVMAC (Delete Virtual MAC) command is defined for this purpose (see FIG. 3). The DELVMAC command removes the specified MAC address from the NVL forwarding table 122.

The use of the SETVMAC and DELVMAC commands enables any host 110 in a partitioned environment to share a single network adapter 104 in a single host-to-network interface. This enables any host 110 to support any protocols that traverse the layer 2 media over a single host-to-network interface.

Figure 6:
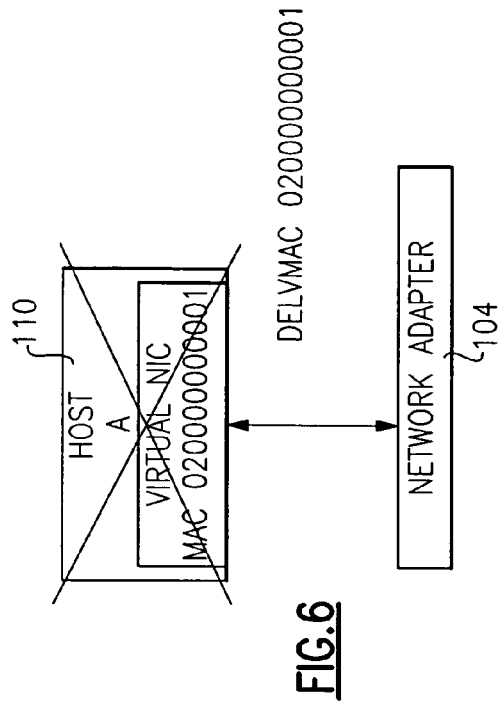
FIGS. 6 and 7 show the deletion of a virtual MAC address in accordance with the present invention.
Figure 7:
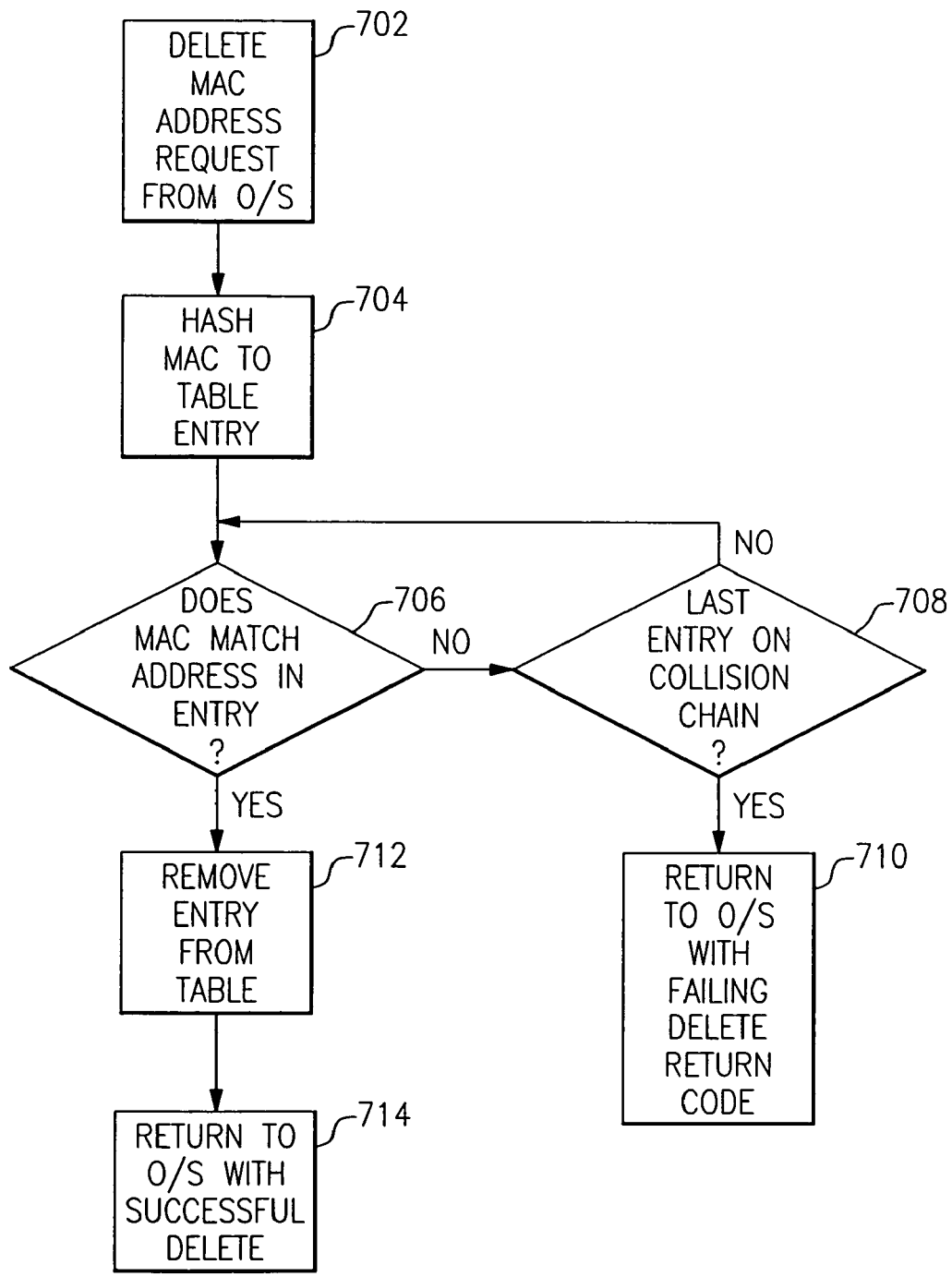

FIGS. 6 and 7 show the deletion of a virtual MAC address by a host OS 110. The host OS 110 initiates the procedure by issuing a DELVMAC command, in this case

DELVMAC 020000000001, where the above expression is a convenient mnemonic for the actual command format described earlier (step 702). Upon receiving this command, NVL 120 hashes the indicated MAC address to an entry 402 in virtual MAC address table 122 (step 704). If the MAC address does not match the address in the table entry 402 (step 706), and there are remaining entries in the hash collision chain (step 708), the routine returns to step 706 to examine the next entry in the hash collision chain. If at step 708 there are no remaining entries in the hash collision chain, NVL 120 generates an appropriate return code indicating a failed delete operation and returns to the host OS 110 (step 710).). If at any traversal of step 706 the indicated MAC address matches the address 412 in the table entry 402, NVL 120 removes the entry 402 from the table 122 (step 712) and returns to the host OS 110 with a return code indicating a successful delete operation (step 714).

SETGMAC/DELGMAC

In a similar manner, in accordance with the present invention, SETGMAC (Set Group MAC) and DELGMAC (Delete Group MAC) commands are defined to enable any host 110 in a multi-partitioned environment to "listen" on the same layer 2 interface with other hosts 110 in the multi-partitioned environment. Each SETGMAC command issued by a host 110 is added to group MAC address forwarding table 124. This table 124 tracks all the hosts 110 that have registered (issued a SETGMAC for) the same group MAC address. Except for its ability to register multiple hosts 110 for a single MAC address, group MAC address table 124 is similar in structure to individual MAC address table 122. When a network packet or host packet 108 is received with a destination MAC address 130 matching an entry in the table 124, all hosts 110 registered with the group MAC address will receive the packet 108.

The SETGMAC layer 2 primitive is used to register a group MAC address with the network adapter 104. The network adapter 104 uses the group MAC address for layer 2 switching to determine which OS should receive a received multicast packet. The DELGMAC layer 2 primitive is used to unregister a group MAC address from the network adapter 104.

The primitive-specific data for these commands beginning at byte offset 20 is as follows:

| Offset | Length | Description |
| --- | --- | --- |
| 20 | 4 | Length of group MAC address |
| 24 | 6 | Group MAC address |

The group address bit must be on for the command to be accepted.

Figure 8:
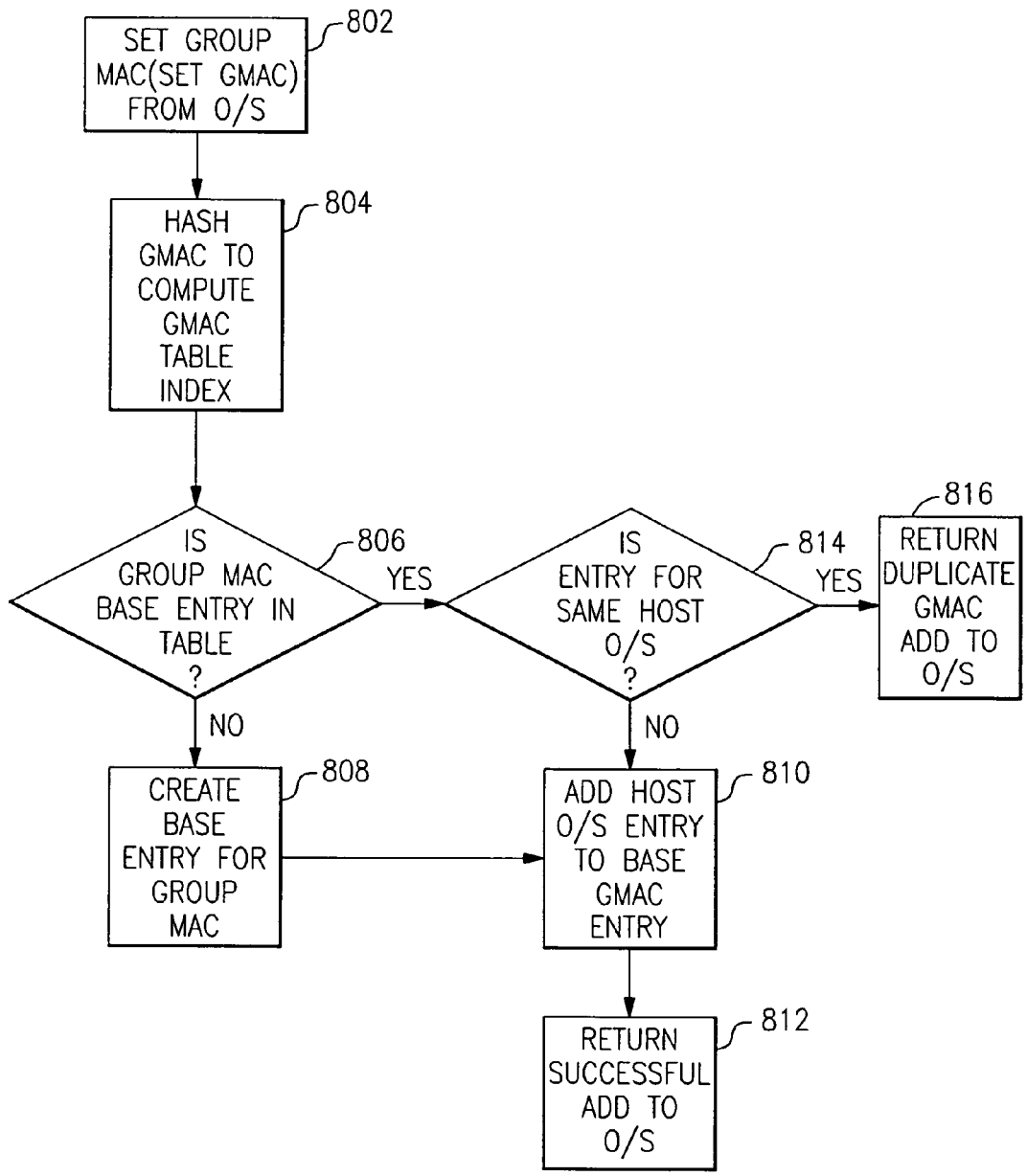
FIG. 8 shows the setting of a group MAC address in accordance with the present invention.

FIG. 8 shows the setting of a group MAC address by a host OS 110. The host OS 110 initiates the procedure by issuing a SETGMAC command (step 802). Upon receiving this command, NVL 120 hashes the indicated group MAC address to generate an index into the group MAC address table 124 (step 804). NVL 120 next determines whether there is already a base entry for this index in the group MAC address table 124, indicating that a host has already registered this group MAC address (step 806). If not, then NVL 120 creates a base entry for the group MAC address (step 808), adds an entry for the host OS 110 to the base entry (step 810), and generates a return code indicating the successful addition of a group MAC address to the table 124 (step 812). If at step 806 there is a group MAC base entry in the table 124, NVL 120 determines whether the entry is for the same host OS 110 (step 814). If so, NVL 120 generates a return code indicating that the host OS 110 is attempting to register a duplicate group MAC address (step 816). Otherwise, NVL 120 proceeds to step 810, where it operates as described above, except that in this case it adds host 110 to a linked list of entries for the base entry. This linked list is used to forward packets received with a matching group address to all hosts on the linked list.

SETVLAN/DELVLAN

Finally, in accordance with the present invention, a set of commands are associated with VLAN (virtual LAN) configurations. These commands are used by various hosts 110 in a multi-partitioned environment to associate themselves together in the same VLAN where applicable. In the embodiment shown, these commands are defined as SETVLAN (Set VLAN) and DELVLAN (Delete VLAN). Any host 110 can issue a SETVLAN command to NVL 120. NVL 120 then "joins" together all hosts 110 which register on the same VLAN.

The format is very similar to that used for group addresses. When a VLAN is registered, the NVL checks for a base entry defined for that VLAN. If there is no such base entry, a base entry is created, then the initial host entry is added as the first entry on the linked list. As additional host register with the same VLAN, they are added to the linked list.

Hosts 110 that register on different VLANs are not allowed to communicate with each other. This isolates various hosts 110 or host groups within the multi-partitioned environment. This gives the system the capability to isolate or segregate the traffic in the multi-partitioned environment to flow between the hosts 110 belonging to the same VLAN. A single host 110 does have the capability of joining multiple different VLANs.

Figure 10:
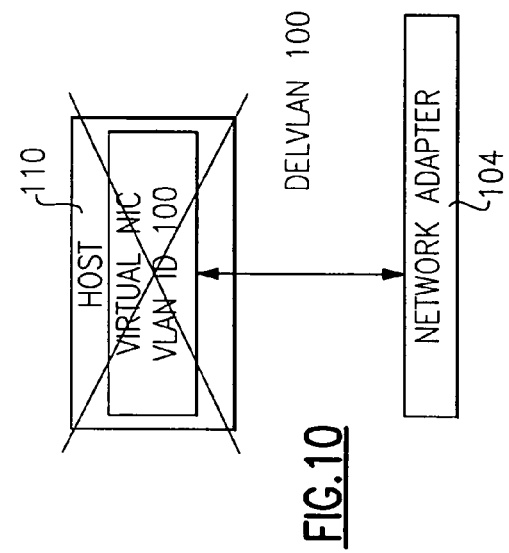
FIG. 10 shows the removal of a virtual LAN assignment.
Figure 9:
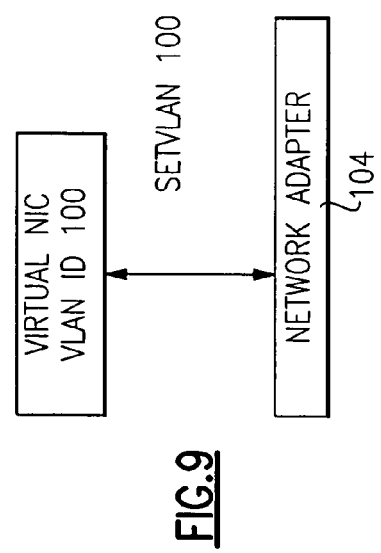
FIG. 9 shows the establishment of a virtual LAN assignment.

The SETVLAN layer 2 primitive (FIG. 9) is used to register the VLAN ID of a connection with the network adapter 104. The network adapter 104 uses the VLAN ID to determine if any received packet, including a multicast or broadcast packet, should be forwarded to the specific connection. The DELVLAN layer 2 primitive (FIG. 10) is used to unregister a VLAN ID from the network adapter 104.

The primitive-specific data for these commands beginning at byte offset 20 is as follows:

| Offset | Length | Description |
| --- | --- | --- |
| 20 | 2 | 12-bit VLAN ID, right justified |

This command only affects the inbound routing code for broadcast packets.

Inbound Data Flow

Unicast Traffic

For inbound data flow, code within network adapter 104 for controlling unicast traffic uses the layer 2 destination MAC address 130 (FIG. 1C) to make all forwarding decisions. If the destination MAC address 130 is not registered, then the packet 108 is dropped. In the embodiment shown, this is done because the network adapter 104 runs in promiscuous mode and receives all packets from the network that have been forwarded by an attached switch.

Broadcast Traffic

Broadcast traffic is forwarded to a host partition once a SETVMAC command has been issued by the host OS. If the broadcast packet contains a VLAN header, the matching VLAN ID must have been registered in order for the host to receive the broadcast.

Multicast Traffic

To receive multicast packets from the network, a host OS must have registered the MAC group address using the SETGMAC command. The SETGMAC must contain the specific MAC group address contained in the destination address field of the MAC header. Since this is from a layer 2 perspective, no associated layer 3 protocol address must also match. Only the layer 2 group address is used to forward the packet. All hosts that have registered the group MAC address receive a copy of the packet. If the multicast packet contains a VLAN header, the matching VLAN ID must have been registered in order for the host to receive the multicast packet.

VLAN Forwarding Rules

The following table summarizes the rules that are used for routing inbound packets when a VLAN tag is present and when it is not. These rules try to match the switch rules being used in vendors' LAN equipment. Each guest LAN may register more than one VLAN tag, and the same VLAN tag may be registered by more than one guest LAN.

| Frame Type | Unicast | Multicast | Broadcast |
|---|---|---|---|
| Non-Tag frames | Forwarded when destination MAC matches registered MAC Address | Forwarded to all guest LANs registering matching group MAC | Forwarded to all guest LANs enabled for layer 2 |
| Tagged Frames | Forwarded when destination MAC matches registered MAC address and matching VLAN tag has been registered by guest LAN. | Forwarded only to guest LANs registering matching group MAC and matching VLAN tag | Forwarded to all guest LANs that registered matching VLAN tag |

Outbound Data Flow

Unicast Traffic

For outbound unicast packets, the destination MAC address is used for all routing decisions. OSA first looks at the locally connected hosts to determine if the destination MAC is a locally attached host. The requirement that all locally attached hosts set the locally administered bit in their virtual MAC address is used to make the search more efficient. If a locally attached host cannot be found, the packet is sent on the external LAN.

Broadcast/Multicast

For outbound broadcast and multicast packets, the packet is forwarded to any locally attached hosts that meet the criteria described above for the inbound data flow. The packet is always sent on the external LAN.

Figure 5:
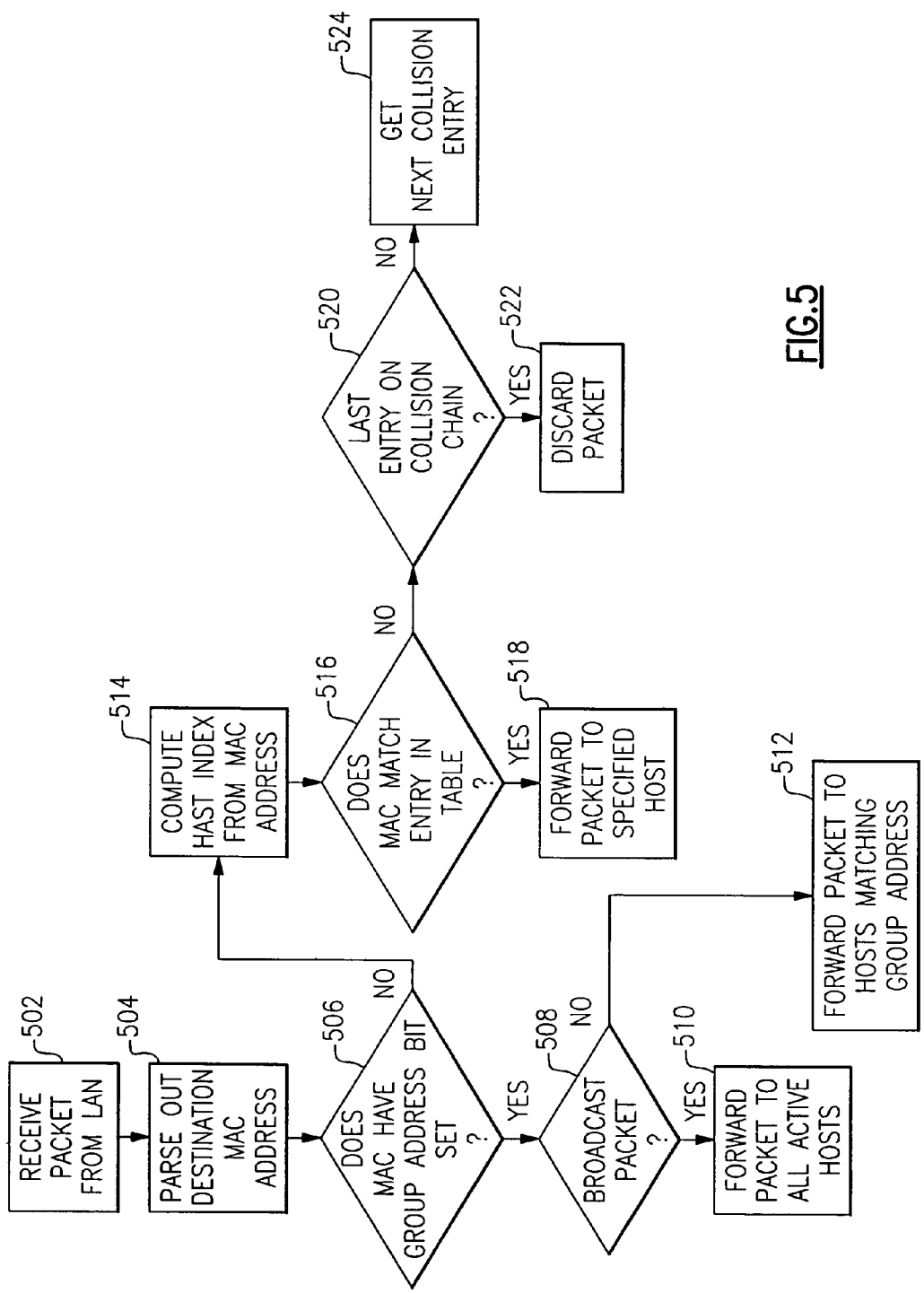
FIG. 5 shows the handling of a received packet by the network virtualization layer of the present invention.

FIG. 5 shows the handling of a received packet 108 by NVL 120. Upon receiving a packet 108 from the network (step 502), NVL 120 parses out the destination MAC address 130 contained in the received packet 108 (step 504). NVL 120 then determines whether the MAC address has the group address bit set to 1, indicating that the address is a group address (step 506). If the MAC address has the group address bit set, NVL 120 determines whether the packet 108 is a broadcast packet (step 508). If the packet 108 is a broadcast packet, then NVL 120 forwards the packet to all active hosts 110 (step 510). Otherwise, NVL 120 forwards the packet 108 only to those hosts 110 matching the group MAC address, as indicated by the group MAC address table 124 (step 512).

If at step 506 the MAC address does not have the group address bit set, then NVL 120 computes a hash index from the MAC address to locate a table entry (step 514) and determines whether the MAC address matches the entry (step 516). If so, it forwards the packet 108 to the specified host 110 (step 518). If the current table entry is the last entry on a hash collision chain (step 520), NVL 120 discards the packet 108 (step 522). Otherwise, NVL 120 gets the next entry on the chain (step 522) and returns to step 516 and repeats the procedure until either a matching entry is found or the end of the chain is reached.

The above procedure assumes that no VLAN tag 132 is present. If the packet 108 contains a VLAN tag 132, then the forwarding is further scoped in accordance with the VLAN forwarding table 126. Thus, at step 510, if a VLAN tag is present, then NVL 120 forwards the packet 108 only to those active hosts 110 matching the VLAN tag. Similarly, at step 512, if a VLAN tag is present, then NVL 120 forwards the packet 108 only to those hosts 110 matching both the group MAC address and the VLAN tag. Finally, at step 518, NVL 120 forwards the packet 108 to the host 120 matching the unique MAC address only if the host 120 also matches the VLAN ID.

Initialization Flow

Figure 11:
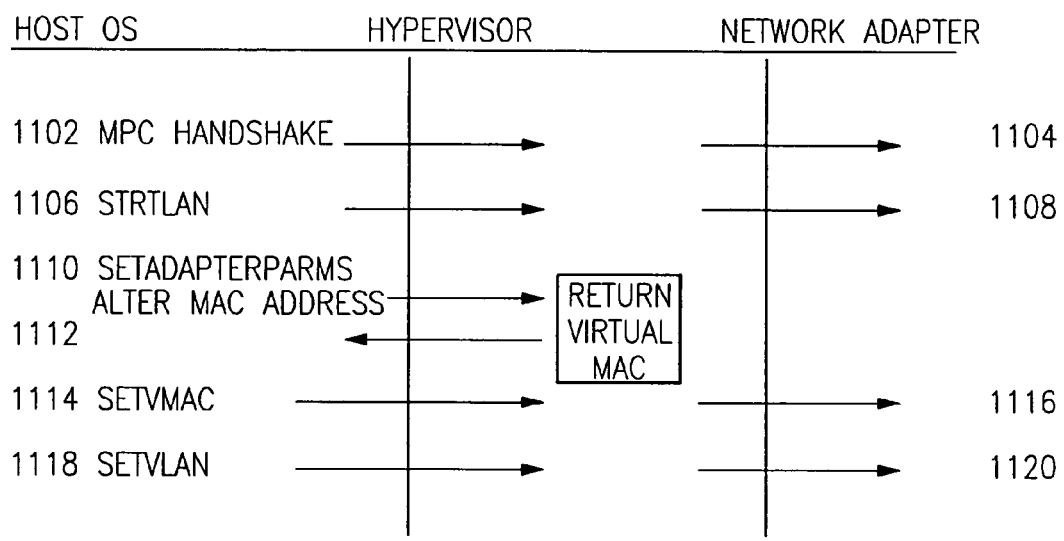
FIG. 11 shows the initialization sequence between a host system, the hypervisor and the network adapter shown in FIG. 1.

FIG. 11 shows the initialization sequence that occurs between a host OS 110, the hypervisor 112 and the network adapter 104. The initial multipath channel (MPC) handshake used for the current QDIO layer 3 flow is carried forward for the layer 2 mode (steps 1102 and 1104). The changes outlined below are the only modifications to this flow.

The STRTLAN/STOPLAN concept used for indicating when a LAN is online or offline is also used in the layer 2 mode. The STRTLAN command is the first control command used after the MPC handshake completes (steps 1106 and 1108). If the LAN port is offline, the STRTLAN is returned with a 0xE080 return code and the initialization sequence between the hypervisor 112 and network adapter 104 is suspended. When the LAN comes online, the network adapter 104 generates a STRTLAN to indicate the port is now ONLINE and the initialization continues. This is the same functionality that is used today in a layer 3 implementation.

After the STRTLAN completes, the host OS 110 requests a virtual MAC address from the hypervisor 112 by issuing the SetAdapterParms assist and specifying the hardware command of Alter MAC Address with the Read MAC Address subcommand code (step 1110). This will assign a virtual MAC address to the OS device driver (step 1112). The list of virtual MAC addresses is controlled by a system administrator responsible for the configuration of the guest LAN environment running under the hypervisor 112.

The OS device driver then issues the SetVMAC layer 2 assist of the present invention to register this virtual MAC address with the hypervisor 112 (step 1114). The hypervisor 112 then issues the SetVMAC layer 2 assist of the present invention to register the virtual MAC address with the network adapter 104 (step 1116).

In connection with the above steps, the hypervisor 112 fabricates virtual devices for the host OS 110. Those virtual devices simulate the functions of the network adapter 104 (with appropriate deviations as dictated by the difference in context). For example, the network adapter 104 has a "burned-in" MAC address that is unique for each physical network card. The hypervisor 112 assigns a MAC address to each virtual NIC that is unique within the context of this instance of the hypervisor 112. The hypervisor 112 does not have direct access to the tables 122-126 within the network adapter 104, but uses similar structures to manage MAC addresses and VLAN IDs based on SET* and DEL* commands from individual virtual machine hosts 110. In general, the actions of the host OS 110 in a virtual NIC are translated into appropriate actions on the real network adapter 104. A SETVMAC from a host OS 110 will result in a SETVMAC down to the physical network adapter 104. A SETGMAC from a host OS 110 will only result in a SETGMAC to the network adapter 104 if this is the first host to join that particular multicast group.

The SetVLAN layer 2 assist of the present invention is used to register 802.1Q tags with the hypervisor 112 (step 1118) and network adapter 104 (step 1120). These 802.1Q tags are controlled by the same system administrator responsible for the virtual MAC addresses.

Changes to MPC Initialization Flow

In the embodiment shown, a host OS 110 now specifies the OS identifier in the IDX exchange in the IDXFLVL (function level). The current values for this are 0×0101 (z/OS), 0×4101 (Linux), 0×B101 (z/VM) and 0×C101 (VSE). OSA will respond with a 0×2101 in the IDX reply.

A new interest group value is defined in the Enable IC MPC primitive. For the layer 3 support, the current value specified in the Filter Data DIF (type of 01) on the Enable IC primitive on the user session is TCPIP, which equates to a value of 0×03. For layer 2 support, a new value is defined called LAYER 2, and it equates to a value of 0×08.

All versions of the network adapter 104 not having the layer 2 support of the present invention will reject the Enable IC primitive with an error code of 0×41 because the new value will be undefined.

The network adapter 104 will continue to support the layer 3 mode along with the layer 2 mode. A specific QDIO data device will support only the layer 2 or layer 3 mode. The Enable_IC exchange determines which mode is supported on the data device. Once the mode has been set, the other mode's Control commands will not be accepted.

The primitive version number in the Layer 2 Assists header is set to a value of 0×02 for all layer 2 primitives.

QDIO Header

A new QDIO header ID (0x02) is defined for the layer 2 support of the present invention. One of the new uses for the QDIO header on inbound is to provide the capability of inbound blocking. The overall packet length is included to provide this capability.

The header includes the following:

| Offset | Size | Description |
| --- | --- | --- |
| 0 | 1 byte | Format ID of header |
| 1 | 3 bytes | Flags |
| 4 | 1 byte | Port number |
| 5 | 1 byte | Frame header length |
| 6 | 2 bytes | Data packet length |
| 8 | 2 bytes | Sequence number |
| 10 | 2 bytes | VLAN priority, VLAN ID |
| 12 | 4 bytes | Reserved |
| 16 | 16 bytes | Reserved |

While a particular embodiment has been shown and described, it will be apparent to those skilled at various modifications can be made without departing from the principles of the invention.

What is claimed is:

1. A method of providing network virtualization in an information handling system comprising a physical machine having a hypervisor thereon for coupling to a network through a physical network adapter, said method comprising the steps of:

the hypervisor dividing the physical machine into a plurality of logical partitions, each of which has a host system residing thereon;

the hypervisor dividing the physical network adapter into a plurality of logical network adapters;

the hypervisor receiving a command from one of said host systems requesting a data like layer address for that host system;

in response to the command requesting a data link address for that host system, the hypervisor generating a data link layer address for the host system that is unique among data link layer addresses originating from host systems of the same physical machine so as to distinguish the data link layer address for the host system from other data link layer addresses originating from the other host systems on the same physical machine;

the hypervisor associating the unique data link layer address with the host system and with a logical network adapter; and the physical network adapter associating the unique data link layer address with the host system.

2. The method of claim 1 in which said data link layer address is a Media Access Control (MAC) address.

3. The method of claim 2 in which said MAC address is a unique MAC address that can be associated with only one of said host systems.

4. The method of claim 2 in which said MAC address is a group MAC address that can be associated with more than one of said host systems.

5. The method of claim 1, further comprising the steps of:

receiving a command from one of said host systems specifying a VLAN ID for that host system; and in response to receiving said command, associating the specified VLAN ID with the host system.

6. The method of claim 1 in which said command is a first command, said method further comprising the steps of:

receiving a second command from one of said host systems specifying a second data link layer address for that host system; and in response to receiving said second command, disassociating the specified second data link layer address from the host system.

7. The method of claim 1, further comprising the step of:

receiving a data packet containing a data link layer address as a destination address;

in response to receiving said data packet, determining whether a host system is associated with said destination address; and if a host system is associated with said destination address, forwarding said data packet to the host system is associated with said destination address.

8. The method of claim 7 in which said data packet is a unicast packet that is forwarded only to a single host system having said destination address as a unique MAC address.

9. The method of claim 7 in which said data packet is a unicast packet that is forwarded only to a single host system having said destination address as a unique MAC address and sharing a VLAN ID with said packet.

10. The method of claim 7 in which said data packet is a multicast packet that is forwarded to all host systems having said destination address as a group MAC address.

11. The method of claim 7 in which said data packet is a multicast packet that is forwarded to all host systems having said destination address as a group MAC address and sharing a VLAN ID with said packet.

12. The method of claim 7 in which said data packet is a broadcast packet that is forwarded to all host systems sharing a VLAN ID with said packet.

* * * * *